US012679979B2

(12) United States Patent
Mitchell Warden et al.

(10) Patent No.: US 12,679,979 B2
(45) Date of Patent: Jul. 14, 2026

(54) BARRIER COATING

(71) Applicant: Honeywell International Inc.,
Charlotte, NC (US)

(72) Inventors: Hillary Mitchell Warden, South Bend,
IN (US); Elizabeth Arndt, South Bend,
IN (US); Laurie A. Booker, South
Bend, IN (US)

(73) Assignee: Honeywell International Inc.,
Charlotte, NC (US)

( * ) Notice: Subject to any disclaimer, the term of this
patent is extended or adjusted under 35
U.S.C. 154(b) by 77 days.

(21) Appl. No.: 18/471,945

(22) Filed: Sep. 21, 2023

(65) Prior Publication Data

US 2025/0101235 A1 Mar. 27, 2025

(51) Int. Cl.

| | |
|---|---|
| *C04B 41/00* | (2006.01) |
| *C04B 41/45* | (2006.01) |
| *C04B 41/50* | (2006.01) |
| *C04B 41/52* | (2006.01) |
| *C04B 41/87* | (2006.01) |
| *C09D 1/00* | (2006.01) |
| *C09D 5/08* | (2006.01) |
| *C09D 5/18* | (2006.01) |

(Continued)

(52) U.S. Cl.
CPC ............ *C09D 1/00* (2013.01); *C04B 41/0072*
(2013.01); *C04B 41/009* (2013.01); *C04B*
*41/4535* (2013.01); *C04B 41/5015* (2013.01);
*C04B 41/5058* (2013.01); *C04B 41/522*
(2013.01); *C04B 41/87* (2013.01); *C09D 5/084*
(2013.01); *C09D 5/18* (2013.01); *C09D 7/45*
(2018.01); *C09D 7/63* (2018.01)

(58) Field of Classification Search
CPC .............. C04B 41/0072; C04B 41/009; C04B
41/4535; C04B 41/5015; C04B 41/5058;
C04B 41/522; C04B 41/87
See application file for complete search history.

(56) References Cited

U.S. PATENT DOCUMENTS

| | | | |
|---|---|---|---|
| 3,914,508 | A | 10/1975 | Hooton et al. |
| 5,364,513 | A | 11/1994 | Sekhar et al. |
| 5,806,588 | A | 9/1998 | Weeks, Jr. et al. |

(Continued)

FOREIGN PATENT DOCUMENTS

| | | |
|---|---|---|
| EP | 2930162 A1 | 10/2015 |
| GB | 1311537 A | 3/1973 |

(Continued)

OTHER PUBLICATIONS

Extended Search Report from counterpart European Application
No. 24196824.7 dated Feb. 17, 2025, 9 pp.

(Continued)

*Primary Examiner* — Michael P Wieczorek
(74) *Attorney, Agent, or Firm* — Shumaker & Sieffert,
P.A.

(57) ABSTRACT

In examples, a method for forming a high temperature
coating includes applying a barrier coat formulation on a
substrate. The barrier coat formulation includes mono-alu-
minum phosphate; boron carbide; and molybdenum or a
molybdenum compound. The method further includes heat
treating the barrier coat formulation to form an oxidation-
resistant coating layer, wherein a melting point of the
oxidation-resistant coating layer is greater than about 800
degrees Celsius (° C.).

14 Claims, 2 Drawing Sheets

300

(51) Int. Cl.
    *C09D 7/45*       (2018.01)
    *C09D 7/63*       (2018.01)

(56)            References Cited

U.S. PATENT DOCUMENTS

| | | | |
|---|---|---|---|
| 6,921,431 B2 | 7/2005 | Evans et al. | |
| 8,383,197 B2 | 2/2013 | La Forest et al. | |
| 8,828,540 B2 | 9/2014 | Schmidt et al. | |
| 9,034,461 B2 | 5/2015 | Sugimoto | |
| 9,758,678 B2* | 9/2017 | Nicolaus | C04B 41/5133 |
| 10,899,673 B2 | 1/2021 | Sniezewski et al. | |
| 11,046,619 B2* | 6/2021 | Poteet | C04B 41/5059 |
| 11,198,651 B2 | 12/2021 | Shim et al. | |
| 2004/0038032 A1 | 2/2004 | Walker et al. | |
| 2021/0261474 A1* | 8/2021 | Jadidian | C04B 41/5059 |

FOREIGN PATENT DOCUMENTS

| | | |
|---|---|---|
| GB | 2272705 A | 5/1994 |
| WO | 2006129097 A1 | 7/2006 |

OTHER PUBLICATIONS

U.S. Appl. No. 18/471,884, filed Sep. 21, 2023, naming inventors Mitchell Warden et al.
U.S. Appl. No. 18/471,909, filed Sep. 21, 2023, naming inventors Mitchell Warden et al.
U.S. Appl. No. 18/471,958, filed Sep. 21, 2023, naming inventors Mitchell Warden et al.
Response to Extended Search Report dated Feb. 17, 2025, from counterpart European Application No. 24196824.7 filed Sep. 8, 2025, 14 pp.

* cited by examiner

300

302 — APPLY A BARRIER COAT FORMULATION ON A SUBSTRATE

304 — HEAT TREAT THE BARRIER COAT FORMULATION TO FORM AN OXIDATION RESISTANT COATING LAYER

BARRIER COATING

TECHNICAL FIELD

The disclosure relates to coating systems for high-temperature oxidation protection, such as coating systems used in aircraft braking systems.

BACKGROUND

Carbon, carbon-carbon (C/C) composites, and/or ceramic materials may be used in high temperature applications. For example, the aerospace industry employs C/C composite components as friction materials for commercial and military aircraft, such as brake friction materials. Applications of such high temperature materials also include hypersonic applications, locomotive brakes, space vehicle structural components, and more. In high temperature applications, carbon, C/C composites, or ceramics may be susceptible to oxidation, which may lead to deterioration of physio-mechanical properties and/or recession of portions of a component.

SUMMARY

In some examples, the disclosure is directed to articles which include and techniques for making oxidation-resistant barrier coating layers. The oxidation-resistant barrier coating layer may be formed by applying a barrier coat formulation to a surface of a carbon, carbon-carbon (C/C) composite, or ceramic substrate. The oxidation-resistant coating layer has a melting point of greater than about 800 degrees Celsius (° C.).

In some examples, the disclosure is directed to a technique for forming a high temperature coating. The technique includes applying a barrier coat formulation on a substrate. The barrier coat formulation includes mono-aluminum phosphate; boron carbide; and molybdenum or a molybdenum compound. The technique includes heat treating the barrier coat formulation to form an oxidation-resistant coating layer, wherein a melting point of the oxidation-resistant coating layer is greater than about 800° C.

In some examples, the disclosure is directed to an article. The article includes a substrate comprising at least one of carbon, carbon-carbon (C/C) composite, or ceramic. The article includes a barrier coat formulation applied on a surface of the substrate, the barrier coat formulation includes mono-aluminum phosphate; boron carbide; and molybdenum or a molybdenum compound. A melting point of the oxidation-resistant coating layer is greater than about 800° C.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
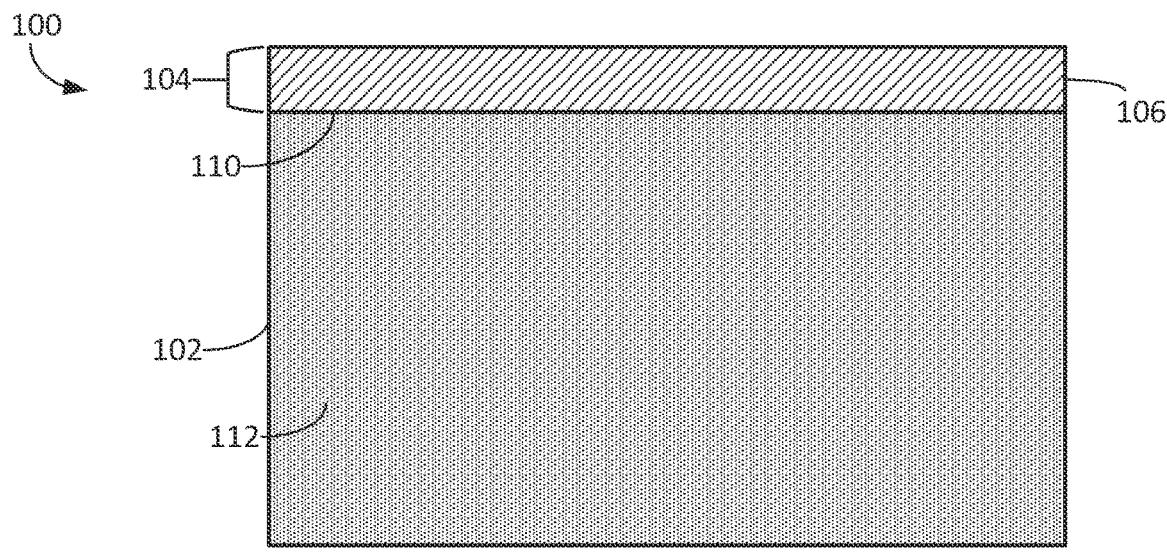
FIG. 1 is a schematic cross-sectional view illustrating an article, according to one or more examples of the present disclosure.

Carbon, carbon-carbon (C/C) composite, and/or ceramic components may provide good mechanical properties and have low mass density relative to other materials, such as metal alloys. However, at high temperatures, such materials may be susceptible to oxidation, environmental attack, and degradation of physio-mechanical properties. For example, C/C components used as aircraft brake discs routinely reach temperatures above 350 degrees Celsius. Other example high temperature applications of C/C composite components include locomotive brakes, space vehicle structural components, and hypersonic applications, such as leading edges and rocket nozzles.

At high temperature (e.g., greater than about 350° C.), carbon in the component substrate may react with oxygen in the air, which may result in reduced strength or useful life of the component. Furthermore, when catalytic substances such as sea water or runway de-icers contact the component, the temperature at which oxidation may occur may be reduced or the rate of oxidation may be increased, which may further impact the strength or useful life of the component.

Penetrant antioxidants (e.g., phosphate-based penetrant antioxidants) may be applied to C/C composites to reduce the deleterious effect of thermal and/or catalytic oxidation. However, penetrant antioxidants, whether infiltrated into pores of the component or as a coating layer, may decompose over repeated exposure to high temperatures (e.g., 350° C.) or even relatively short exposure (e.g., minutes to hours) at extremely high temperatures (e.g., greater than about 1000° C.). During braking, discs in an aircraft brake may reach such extremely high temperatures.

In accordance with one or more aspects of the disclosure, a barrier coat formulation may be applied to one or more surfaces of the carbon, C/C composite, or ceramic component substrate. The barrier coat formulation may include mono-aluminum phosphate; boron carbide; and molybdenum. Advantageously, the barrier coat formulation may form a paint-like colloidal suspension that may be applied to the substrate by brushing or spraying. The barrier coat formulation may be heat treated (e.g., brought to a temperature of at least about 500° C., such as about 700° C.) to form an oxidation-resistant coating layer on the substrate. The oxidation resistant coating layer has a melting point of greater than about 800° C. The term "about," as used herein, may include a range that accounts for measurement, actuation, and/or process control error or variation, such as the stated value and those values within 10% of the stated value. The oxidation-resistant barrier coating may protect the substrate from oxidation and the resulting loss of strength and loss of useful life, even at high and extremely high temperatures.

The molybdenum may be added as an elemental metal or as a molybdenum compound. Example molybdenum compounds include molybdenum oxide, molybdenum carbide, molybdenum nitride, or the like. When added as an elemental molybdenum to the barrier coat formulation, the molybdenum may react with oxygen during operation of the component, or with carbon of the substrate. Advantageously, molybdenum compounds are stable and corrosion resistant to high temperatures. Furthermore, molybdenum complexes are typically relatively hard, such that barrier coat formulations which contain molybdenum are more stable and more impact resistant that barrier coat formulations which do not include molybdenum.

The barrier coat formulation may be applied to surfaces of the component substrate that are exposed to the environment (e.g., air), and thus to oxidizing agents (e.g., oxygen) during operation of the component. For example, the disclosed barrier coat formulations may be applied to non-friction surfaces of aircraft brake discs, or other components. The barrier coat formulation may be applied by brushing or spraying the barrier coat formulation at any suitable thickness to the component. For example, the barrier coat formulation may be applied in a range of from about 0.01 millimeters (mm) to about 2.0 millimeters thick, when measured normal to the surface of the substrate. The barrier coat formulation may shrink and/or densify during the heat treatment, such that the resulting antioxidant coating layer may be thinner than the barrier coat formulation as applied.

The heat treatment is configured to dry, densify and/or harden the applied barrier coat formulation to create the antioxidant coating layer. The heat treatment may be conducted locally (e.g., via a mobile heating unit such as a heat lamp, torch, or the like) or globally (e.g., in a furnace). In some examples, the heat treatment may continue for a duration of from about 2 minutes to about 24 hours. The heat treatment may be conducted in air, in a controlled environment (e.g., using argon, nitrogen, or the like), or in a vacuum. The heat treatment may be tailored to improve properties of the resulting antioxidant coating layer. For example, heating ramp rate, cooling ramp rate, and separate heating steps that vary in temperature may be employed to control the porosity, microstructure, and/or homogeneity of the resulting antioxidant coating layer.

FIG. 1 is a schematic cross-sectional view of a portion of an example substrate 102 of an article 100, according to one or more examples of the disclosure. The illustrated portion of article 100 may be a portion of a high-temperature aerospace, automotive, or locomotive component, such as an aircraft brake disc.

In the example of FIG. 1, substrate 102 of article 100 includes a carbon/carbon (C/C) composite 112; however, in other examples, substrate 102 may include a carbon or ceramic substrate. C/C composite 112 may include carbon-based reinforcement fibers and a carbon-based matrix material at least partially surrounding the carbon-based reinforcement fibers. In some examples, C/C composite 112 may be formed form a porous preform that includes carbon fibers or carbon-precursor fibers. Examples of porous preforms that may be used to produce C/C composite 112 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

In some examples, C/C composite 112 may include fiber made from pre-oxidized polyacrylonitrile (PAN) resins. These fibers can be layered together to form shapes, such as friction brake discs, which may be heated and infiltrated with methane or another pyrolyzable carbon source to form C/C composite preforms. In some examples, C/C composites 112 may have a density in a range of from about 1.6 $g/cm^3$ through 1.9 $g/cm^3$. In one specific example, not intended to be limiting, C/C composite 112 of article 100 may be fabricated from woven fabric panes of pitch-based Amoco® P30X carbon fiber tows in a harness satin weave or from a pitch-based Nippon® XNC25 in a plain weave. The tows may be rigidized with a few weight-% carbon-containing resin, such as epoxy Novolac®. The material may be carbonized at a temperature in the range of from about 800° C. to about 1000° C., and may be densified by chemical vapor deposition. The resulting material may then be annealed in an inert gas (e.g., nitrogen, argon) at a temperature in a range of from about 1600-2600° C. The process may create C/C composite 112 that is adaptable for use in high temperature environments when properly protected against oxidation. It is understood that the disclosed barrier coat formulations be applied to C/C composites 112 to create antioxidant coating layers, regardless of how C/C composite 112 is fabricated.

In accordance with one or more aspects of the current disclosure, antioxidant coating system 104 may be disposed on surface 110 of substrate 102. Antioxidant coating system 104 may be configured to protect C/C component 112 from oxidation during high temperature operation of article 100. Antioxidant coating system 112 may include antioxidant coating layer 106. Antioxidant coating layer 106 may provide a barrier between the environment and C/C composite substrate 112. In some examples, antioxidant coating layer may substantially seal and/or passivate surface 110, thus preventing oxidizing agents in the environment from breaking down C/C composite substrate 112. In some examples, antioxidant coating system 104 (e.g., antioxidant coating layer 106) may extend into pores of substrate 102. In some examples, pores of substrate 102 may extend on the order of millimeters into substrate 102 below surface 110, for example from about 0.1 mm to about 10 mm.

Antioxidant coating layer 106 may formed by heat treatment of a barrier coat formulation that is applied to surface 110. In some examples, the barrier coat formulation may be a paint-like colloidal suspension which may be applied by brushing or spraying the barrier coat formulation on surface 110, although other methods of application are also considered, such as immersion or dipping.

The barrier coat formulation may include several different components. Each component may contribute to the resulting properties of antioxidant coating layer 106. In some examples, the barrier coat formulation may include each of mono-aluminum phosphate; boron carbide; and molybdenum. The barrier coat formulation may optionally further include water and/or a surfactant. A barrier coat formulation which includes each of these ingredients may be heat treated to create antioxidant coating layer(s) which provide improved antioxidant properties relative to conventional coatings. The resulting antioxidant coating layer 106 may be a glassy mono-aluminum phosphate layer with the other components of the formulation homogenously dispersed therein. In some examples, the glassy mono-aluminum phosphate matrix of antioxidant coating 106 may include at least some (e.g., all) of the mono-aluminum phosphate in an amorphous state.

In some examples, the barrier coat formulation may include mono-aluminum phosphate. The mono-aluminum phosphate may be, for example, aluminum hydrogen phosphate. In some examples, the mono-aluminum phosphate may be in a liquid-phase aqueous solution. In some examples, the mono-aluminum phosphate may in a range of from about 50 weight percent to about 90 weight percent of the barrier coat formulation, such as from about 60 weight percent to about 80 weight percent of the barrier coat formulation. In some examples, the mono-aluminum phosphate may comprise about 67 weight percent of the barrier coat formulation.

In some examples, the barrier coat formulation may include molybdenum. The molybdenum may be included in the barrier coat formulation in elemental form, or as a metal oxide, a metal nitride, a metal boride, combinations thereof, or the like. The molybdenum may be in a powder form for addition to the barrier coat formulation. In some examples, molybdenum may be included in the barrier coat formulation in a range of from about five percent to about 30 weight percent of the barrier coat formulation, for example from about seven weight percent to about 21 weight percent of the barrier coat formulation. During operation, the molybdenum may react with oxygen to form molybdenum oxide, which may be resistant to further oxidation. In some examples, the metal may be in powder form and pass through a 230 mesh, a 270 mesh, a 325 mesh, or a 400 mesh (or finer) screen. In some examples, the powder may include a maximum size of about 100 micrometers, or a maximum size of about 44 micrometers. In such examples, the relatively fine dispersion of metal powder in the barrier coat formulation may result in antioxidant coating 106 having excellent homogeneity.

The molybdenum metal or compound may provide scavenging and/or self-healing functionality to antioxidant coating layer 106. For example, oxidizing agents may penetrate into pores, cracks, or other openings in antioxidant coating system 104. The molybdenum metal or compound may react with an oxidizing species and form a passivated phase or layer that may further densify antioxidant coating layer 106.

The barrier coat formulation may further include boron carbide. Boron carbide may assist in forming a glassy antioxidant coating layer 106 which may be resistant to intrusion of oxidizing agents. Furthermore, the boron carbide may provide hardness to antioxidant coating layer 106 which is resistant to impact and impingement. In some examples, the boron carbide may be included in the barrier coat formulation in a range of from about five percent to about 30 weight percent of the barrier coat formulation, for example from about seven weight percent to about 21 weight percent of the barrier coat formulation.

In some examples, the barrier coat formulation may further include water. Water may assist in creation of a homogenous antioxidant coating layer 106 after heat treatment. Moreover, the water may modify the viscosity of the barrier coat formulation so that the barrier coat formulation may be relatively easier to mix and apply to substrate 112, when compared to barrier coat formulations which do not include water as an ingredient. In some examples, water may be included in a range of from about one weight percent to about 10 weight percent of the barrier coat formulation, such as about four weight percent of the barrier coat formulation.

Antioxidant coating layer 106 may be formed from a barrier coat formulation which includes a surfactant. In some examples, the surfactant may assist in dispersing the ingredients of the barrier coat formulation in a colloidal suspension, such that after application and heat treatment, antioxidant coating layer 106 is homogenous, and does not contain or contains only minimal agglomerations. In some examples, the surfactant may include an ethoxylated acetylenic diol surfactant. For example, the surfactant may be Surfynol® 440, available from supplier Evonik Corporation of Germany. In some examples, the surfactant may be included in the barrier coat formulation in a range of from about 0.5 weight percent to about 3 weight percent.

The barrier coat formulation may be applied to surface 110 of component substrate 102. In some examples, surface 110 may be a friction surface or a non-friction surface of an aircraft brake disc. The barrier coat formulation may be applied by brushing or spraying the barrier coat formulation at any suitable thickness to surface 110. For example, the barrier coat formulation may be applied in a range of from about 0.01 millimeters (mm) to about 2.0 millimeters thick, when measured normal to surface 110 of substrate 102. The barrier coat formulation may shrink and/or densify during the heat treatment, such that resulting antioxidant coating layer 106 may be thinner than the barrier coat formulation as applied.

The applied barrier coat formulation may be heat treated to create antioxidant coating layer 106. The heat treatment may be configured to dry, densify and/or harden the applied barrier coat formulation to create antioxidant coating layer 106. As such, the heat treatment may evaporate the water, surfactant, and/or other volatile components of the barrier coat formulations. The heat treatment may be conducted locally (e.g., via a mobile heating unit such as a heat lamp, torch, or the like) or globally (e.g., in a furnace). In some examples, the heat treatment may continue for a duration of from about 2 minutes to about 24 hours. The heat treatment may be conducted in air, in a controlled environment (e.g., using argon, nitrogen, or the like), or in a vacuum. The heat treatment may be tailored to improve properties of the resulting antioxidant coating layer. For example, heating ramp rate, cooling ramp rate, and separate heating steps that vary in temperature may be employed to control the porosity, microstructure, and/or homogeneity of the resulting antioxidant coating layer. In some examples, the heat treatment be conducted at a temperature of at least about 500° C., such as about 700° C. In some cases, the heat treatment may result in a glassy (e.g., amorphous) aluminophosphate backbone that is modified by the boron carbide and molybdenum. In some examples, the molybdenum may form a molybdenum oxide that further passivates antioxidant coating layer 106.

Heat treatment of the barrier coat formulation on surface 110 may create antioxidant coating layer 106. Antioxidant coating layer 106 may be resistant to high temperatures, having a melting point of at least about 800° C., such as at least about 1000° C. As such, inclusion of antioxidant coating layer 106 may make article 100 suitable for use in high temperature (e.g., at least about 350° C.) and/or extremely high temperature applications (e.g., at least about 1000° C.). Furthermore, the glassy nature of antioxidant coating 106 may seal and/or passivate substrate 102 from oxidizing agents, and may lend hardness and toughness properties to antioxidant coating layer 106 that make article 100 suitable for braking applications. In some examples, under braking operations at extremely high temperatures (e.g., at least about 1,000° C.), some phosphates in antioxidant coating layer 106 may boil off. In such examples, the mono-aluminum phosphate may become mobile and reform antioxidant coating layer 106 in newly exposed areas of substrate 102, lending the self-healing nature of antioxidant coating layer 106.

One example heat treatment procedure of the barrier coat formulation to create antioxidant coating layer 106 may include a gradual ramp up in temperature to about 250-350° C. The heat treatment may include a soak wherein the temperature is maintained in the range of 250-350° C. for approximately 1-10 hours. Upon completion of this extended heating step the temperature may be further increased, at the aforesaid rate, until reaching a range of 550-750° C., at which point the temperature is maintained in that range for approximately 1-10 hours. After completion of this second prolonged heat treatment, the article 100 may be gradually cooled at a ramp-down rate on the order of 1-2° C. per minute until reaching ambient temperature. The heat treatment may be carried out in an inert chamber making use of nitrogen or argon, or the like. Alternatively, the heat treatment may be carried out in a vacuum chamber, or in ambient atmospheric conditions.

In some examples, if additional thickness is required, antioxidant coating layer 106 may be increased in thickness by a second and/or third subsequent application and heat treatment. Finally, desired surface characteristics of antioxidant coating layer 106 may be created by one or more subsequent machining processes, which may include burnishing, polishing, or the like.

Figure 2:
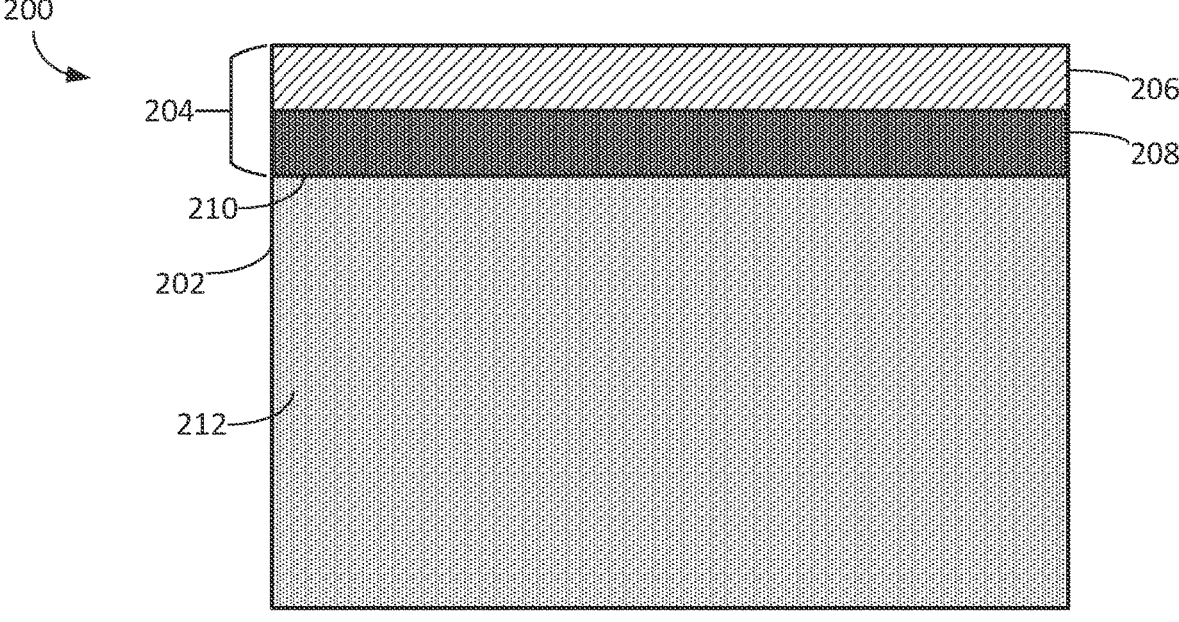
FIG. 2 is a schematic cross-sectional view illustrating an article, according to one or more examples of the present disclosure.

FIG. 2 is a schematic cross-sectional view illustrating of article 200. Article 200 may be an example of article 100 of FIG. 1, and may be described similarly to article 100 as described above, where similar reference numerals indicate similar elements. Article 200 of FIG. 2 differs from article 100 of FIG. 1 as described below.

In some examples, coating system 204 disposed on surface 210 includes penetrant antioxidant underlayer 208 in addition to antioxidant coating layer 206. In some examples, penetrant antioxidant layer may be phosphate-based. Penetrant antioxidant layer 208 may be formed from a penetrant antioxidant formulation configured to both infiltrate pores in C/C composite 212 of substrate 202 and coat surface 110. As such, penetrant antioxidant underlayer 208 may be disposed between antioxidant coating layer 206 and surface 210. Accordingly, in some examples, penetrant antioxidant underlayer 208 may be applied to surface 210 prior to applying antioxidant coating layer 206. In some examples, penetrant antioxidant underlayer 208 may be both applied and heat treated before application of antioxidant coating layer 206. Alternatively, in some examples, penetrant antioxidant underlayer 208 and antioxidant coating layer 206 of coating system 204 may both be applied before the heat treatment, such that both layers are cured during a single heat treatment step. In some cases, penetrant antioxidant underlayer 208 may be built in several discreet applications and heat treatment steps.

The penetrant antioxidant formulation used to form penetrant antioxidant underlayer 208 may be applied by any suitable process, for example brushing, spraying, dipping, immersion, or combinations thereof. Although not always necessary, subsequent coats of penetrant antioxidant underlayer 208 may be generated by additional application and heat treatment of the penetrant antioxidant formulation.

The penetrant antioxidant formulation that is heat treated to create penetrant antioxidant underlayer 208 may, in some examples, be the same formulation as described above with respect to antioxidant coating layer 106. In such examples, the heat treatment may be the same, or the heat treatment may be modified to increase penetration of the formulation into pores of C/C composite 212. However, the formulations used to create penetrant antioxidant underlayer 206 and antioxidant barrier coat 208 may differ. For example, the penetrant antioxidant formulation may be phosphate-based.

Penetrant antioxidant underlayer 208 may be generated by immersion or dipping C/C composite 212 in a liquid bath precursor of fluidized glass for several minutes. Example precursors include phosphoric acid-based penetrant salt solutions. One example penetrant salt solution that can be used to form penetrant antioxidant underlayer 208 contains ions formed from 10-80 weight percent water, 20-70 weight percent $H_3PO_4$, 0.1-25 weight percent alkali metal mono-, di-, or tri-basic phosphate, and optionally up to two weight percent $B_2O_3$. The penetrant antioxidant formulation may also include at least one of $MnHPO_4 \cdot 1.6H_2O$, $Al(H_2PO_4)_3$, and $Zn_3(PO_4)_2$, in weight percentages up to 25, 30, and 10, respectively.

In some examples, the penetrant antioxidant formulation applied to surface 210 of C/C composite 212 may be heat treated to form penetrant antioxidant underlayer 208. The heat treatment may be carried out at a temperature of from about 250-900° C.

In some examples, the heat treatment of the penetrant antioxidant formulation to form penetrant antioxidant underlayer 208, the heat treatment of the barrier coat formulation to form antioxidant coating layer 206, or both, may be carried out with a relatively slow ramp-up and possible slow ramp-down of the heating and cooling rates, respectively. For instance, the ramp-up rate may be on the order of 1-2° C. per minute. In some examples, the controlled ramp rates may minimize undesired porosity and/or limit thermal shocks which can cause cracks.

With respect to the heat treatment of penetrant antioxidant underlayer 208, the time at-temperature may vary. For instance, the heat treatment may include a gradual ramp up in temperature to about 250-350° C. The heat treatment may include a soak wherein the temperature is maintained in the range of 250-350° C. for approximately 1-10 hours. Upon completion of this extended heating step the temperature may be further increased, at the aforesaid rate, until reaching a range of 550-750° C., at which point the temperature is maintained in that range for approximately 1-10 hours. After completion of this second prolonged heat treatment, the component may be gradually cooled at a ramp-down rate on the order of 1-2° C. per minute until reaching ambient temperature.

Figure 3:
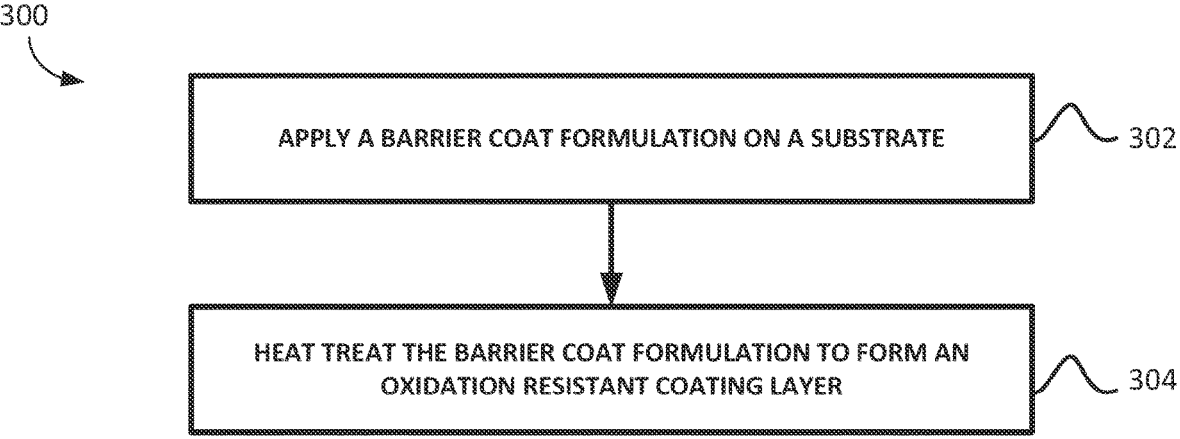
FIG. 3 is a flowchart illustrating an example technique for forming a coating layer, according to some examples of the present disclosure.

FIG. 3 is a flowchart illustrating an example technique for forming a coating layer, according to some examples of the present disclosure. The formed coating layer may be antioxidant coating layer 106 of FIG. 1 or antioxidant coating layer 206 of FIG. 2, although coating layers 106, 206 may be formed by other techniques, and other techniques may be performed to form the described coating layers.

Technique 300 includes applying a barrier coat formulation on surface 110 of substrate 102 (302). The barrier coat formulation includes mono-aluminum phosphate; boron carbide; and molybdenum. Optionally, water and/or a surfactant may further be included. In some example substrate 102 includes a carbon, carbon/carbon (C/C) composite, or ceramic material. The at least one metal may include titanium. In some examples, the surfactant may include ethoxylated acetylenic diol surfactant. 13. In some examples, applying the barrier coat formulation comprises brushing or spraying. The applied barrier coat formulation comprises may have a thickness of from about 0.01 millimeters (mm) to about 2 mm, when measured normal to surface 110 of substrate 102.

In some examples, the mono-aluminum phosphate comprises from about 50 weight percent to about 90 weight percent of the barrier coat formulation, boron carbide comprises from about 5 weight percent to about 30 weight percent of the barrier coat formulation, molybdenum comprises about 5 weight percent to about 30 weight percent of the barrier coat formulation, water comprises about 1 weight percent to about 10 weight percent of the barrier coat formulation, and the surfactant comprises between about 0.5 weight percent and about 3 weight percent of the barrier coat formulation.

In some examples, the mono-aluminum phosphate comprises about 67 weight percent of the barrier coat formulation, molybdenum comprises from about 7 weight percent to about 21 weight percent of the barrier coat formulation, the boron carbide comprises about 7 weight percent to about 21 weight percent of the barrier coat formulation, the water comprises about 4 weight percent of the barrier coat formulation, and the surfactant comprises between about 1 weight percent of the barrier coat formulation.

Technique 300 further includes heat treating the barrier coat formulation to form antioxidant resistant coating layer 106 (304). In some examples, heat treating the barrier coat formulation may result in an antioxidant coating layer that has a melting point of at least about 800° C. In some examples, the heat treatment may be carried out at a temperature of at least about 500 degrees Celsius. The heat treatment may extend for a duration of from about 2 minutes to about 24 hours.

With concurrent reference to FIG. 2, technique 300 may further include further comprising, prior to applying the barrier coat formulation, applying a penetrant antioxidant formulation to create penetrant antioxidant underlayer 208. In some examples, penetrant antioxidant layer 208 and antioxidant coating layer 206 may be created from the same or similar formulations, although in some examples the formulations may differ. In some examples, penetrant antioxidant underlayer 208 phosphate-based. In some examples, technique 300 may include heat treating penetrant antioxidant formulation to penetrant antioxidant underlayer 208 prior to applying the barrier coat formulation.

In some examples, technique 300 may include preparing the barrier coat formulation. Preparing the barrier coat formulation may include adding the water, mono-aluminum phosphate, and surfactant to an acid-resistant vessel and mixing. under continuous mixing, preparation of the formulation may include adding the molybdenum. Additionally, under continuous mixing, preparing the barrier coat formulation may include adding the boron carbide.

EXAMPLES

Example 1

A barrier coat formulation with the following composition: 4.7 weight percent water, 67 weight percent mono-aluminum phosphate, 1 weight percent Surfynol® 440 surfactant, 21 weight percent titanium, 6.3 weight percent boron carbide.

The following numbered clauses illustrate one or more aspects of the devices and techniques described in this disclosure.

Clause 1: A method for forming a high temperature coating includes applying a barrier coat formulation on a substrate, wherein the barrier coat formulation comprises: mono-aluminum phosphate; boron carbide; and molybdenum or a molybdenum compound, heat treating the barrier coat formulation to form an oxidation-resistant coating layer, wherein a melting point of the oxidation-resistant coating layer is greater than about 800 degrees Celsius (° C.).

Clause 2: The method of clause 1, wherein the substrate comprises a carbon, carbon/carbon (C/C) composite, or ceramic.

Clause 3: The method of any of clauses 1 and 2, wherein the barrier coat solution further comprises water.

Clause 4: The method of any of clauses 1 through 3, wherein the barrier coat solution further comprises a surfactant.

Clause 5: The method of clause 4, wherein the surfactant comprises an ethoxylated acetylenic diol surfactant.

Clause 6: The method of any of clauses 1 through 5, wherein the mono-aluminum phosphate comprises from about 50 weight percent to about 90 weight percent of the barrier coat solution, wherein the molybdenum or molybdenum compound comprises from about 5 weight percent to about 30 weight percent of the barrier coat solution, wherein the boron carbide comprises about 5 weight percent to about 30 weight percent of the barrier coat solution, wherein water comprises about 1 weight percent to about 10 weight percent of the barrier coat solution, and wherein a surfactant comprises between about 0.5 weight percent and about 3 weight percent of the barrier coat solution.

Clause 7: The method of clause 6, wherein the mono-aluminum phosphate comprises about 67 weight percent of the barrier coat solution, wherein the molybdenum or molybdenum compound comprises about 11 weight percent of the barrier coat solution, wherein the boron carbide comprises about 6.3 weight percent of the barrier coat solution, wherein the water comprises about 4.7 weight percent of the barrier coat solution, and wherein the surfactant comprises between about 1 weight percent of the barrier coat solution.

Clause 8: The method of any of clauses 1 through 7, further comprising, prior to applying the barrier coat formulation, applying a phosphate-based penetrant antioxidant underlayer.

Clause 9: The method of clause 8, further comprising heat treating the penetrant antioxidant underlayer prior to applying the barrier coat formulation.

Clause 10: The method of any of clauses 1 through 9, further includes adding the water, mono-aluminum phosphate, and surfactant to an acid-resistant vessel and mixing; under continuous mixing, adding the molybdenum; and under continuous mixing, adding the boron carbide.

Clause 11: The method of any of clauses 1 through 10, wherein the heat treatment is at a temperature of at least about 500 degrees Celsius.

Clause 12: The method of any of clauses 1 through 11, wherein the heat treatment extends for a duration of from about 2 minutes to about 24 hours.

Clause 13: The method of any of clauses 1 through 12, wherein applying the barrier coat formulation comprises brushing or spraying.

Clause 14: The method of any of clauses 1 through 13, wherein applying the barrier coat formulation comprises applying a thickness of from about 0.01 millimeters (mm) to about 2 mm.

Clause 15: An article includes a substrate which includes a barrier coat formulation which includes mono-aluminum phosphate; and molybdenum or a molybdenum compound; wherein a melting point of an oxidation-resistant coating layer formed from the barrier coat formulation is greater than about 800 degrees Celsius (° C.).

Clause 16: The article of clause 15, wherein the barrier coat formulation, as applied, further comprises water and a surfactant.

Clause 17: The article of clause 16, wherein the barrier coat formulation, as applied, comprises: molybdenum or a molybdenum compound from about 5 weight percent to about 30 weight percent of the barrier coat solution, boron carbide from about 5 weight percent to about 30 weight percent of the barrier coat solution, water from about 1 weight percent to about 10 weight percent of the barrier coat solution, and the surfactant comprises between about 0.5 weight percent and about 3 weight percent of the barrier coat solution.

Clause 18: The article of any of clauses 15 through 17, wherein the barrier coat formulation, as applied, defines a thickness perpendicular to the surface of the substrate of from about 0.01 mm to about 2 mm.

Clause 19: The article of any of clauses 15 through 18, further comprising a phosphate-based penetrant antioxidant underlayer disposed between the antioxidant coating layer and the surface of the substrate.

Clause 20: An aircraft component comprising the article of clause 19.

Various examples have been described. These and other examples are within the scope of the following claims.

What is claimed is:

1. A method for forming a high temperature coating, the method comprising:
   applying a barrier coat formulation on a substrate, wherein the barrier coat formulation comprises:
   mono-aluminum phosphate;
   boron carbide; and
   molybdenum or a molybdenum compound,
   heat treating the barrier coat formulation to form an oxidation-resistant coating layer, wherein the oxidation-resistant coating layer comprises a glassy mono-aluminum phosphate matrix with the boron carbide and the molybdenum or the molybdenum compound homogeneously dispersed therein, and wherein a melting point of the oxidation-resistant coating layer is at least about 1,000 degrees Celsius (° C.).

2. The method of claim 1, wherein the substrate comprises a carbon, carbon/carbon (C/C) composite, or ceramic.

3. The method of claim 1, wherein the barrier coat formulation further comprises water.

4. The method of claim 1, wherein the barrier coat formulation further comprises a surfactant.

5. The method of claim 4, wherein the surfactant comprises an ethoxylated acetylenic diol surfactant.

6. The method of claim 1, wherein the mono-aluminum phosphate comprises from about 50 weight percent to about 90 weight percent of the barrier coat formulation,
   wherein the molybdenum or molybdenum compound comprises from about 5 weight percent to about 30 weight percent of the barrier coat formulation,
   wherein the boron carbide comprises about 5 weight percent to about 30 weight percent of the barrier coat formulation,
   wherein water comprises about 1 weight percent to about 10 weight percent of the barrier coat formulation, and
   wherein a surfactant comprises between about 0.5 weight percent and about 3 weight percent of the barrier coat formulation.

7. The method of claim 6, wherein the mono-aluminum phosphate comprises about 67 weight percent of the barrier coat formulation,
   wherein the molybdenum or molybdenum compound comprises about 11 weight percent of the barrier coat formulation,
   wherein the boron carbide comprises about 6.3 weight percent of the barrier coat formulation,
   wherein the water comprises about 4.7 weight percent of the barrier coat formulation, and
   wherein the surfactant comprises about 1 weight percent of the barrier coat formulation.

8. The method of claim 1, further comprising, prior to applying the barrier coat formulation, applying a phosphate-based penetrant antioxidant underlayer.

9. The method of claim 8, further comprising heat treating the penetrant antioxidant underlayer prior to applying the barrier coat formulation.

10. The method of claim 1, further comprising preparing the barrier coat formulation wherein preparing the barrier coat formulation comprises:
   adding water, the mono-aluminum phosphate, and surfactant to an acid-resistant vessel and mixing;
   under continuous mixing, adding the molybdenum or molybdenum compound; and
   under continuous mixing, adding the boron carbide.

11. The method of claim 1, wherein the heat treatment is at a temperature of at least about 500 degrees Celsius.

12. The method of claim 1, wherein the heat treatment extends for a duration of from about 2 minutes to about 24 hours.

13. The method of claim 1, wherein applying the barrier coat formulation comprises brushing or spraying.

14. The method of claim 1, wherein applying the barrier coat formulation comprises applying a thickness of from about 0.01 millimeters (mm) to about 2 mm.

* * * * *